United States Patent [19]

Islam et al.

[11] Patent Number: 5,138,130
[45] Date of Patent: Aug. 11, 1992

[54] LASER ROUGH AND FINISH MACHINING OF HARD MATERIALS

[75] Inventors: M. U. Islam, Orleans; Gavin McGregor; G. Campbell, both of Gloucester, all of Canada

[73] Assignee: National Research Council of Canada, Canada

[21] Appl. No.: 652,420

[22] Filed: Feb. 7, 1991

[30] Foreign Application Priority Data

Feb. 7, 1990 [CA] Canada ................................ 2009514

[51] Int. Cl.$^5$ .......................................... B23K 26/00
[52] U.S. Cl. .............................. 219/121.6; 219/121.85
[58] Field of Search .................... 219/121.66, 121.65, 219/121.67, 121.72, 121.85, 121.6

[56] References Cited

U.S. PATENT DOCUMENTS

| | | | |
|---|---|---|---|
| 4,797,530 | 1/1989 | Iwase | 219/121.85 |
| 4,900,892 | 2/1990 | Baeuerle et al. | 219/121.85 |
| 4,914,270 | 4/1990 | Copley et al. | 219/121.68 |
| 4,937,421 | 6/1990 | Ortiz, Jr. et al. | 219/121.68 |
| 4,972,061 | 4/1990 | Duley et al. | 219/121.66 |

Primary Examiner—C. L. Albritton
Attorney, Agent, or Firm—Eckert Seamans Cherin & Mellott

[57] ABSTRACT

A method of laser machining hard material workpieces comprises the steps of applying a high energy, short duration laser pulse to a succession of spots on the surface of a workpiece, the duration, wavelength, and energy and of each laser pulse being such that said energy is substantially completely consumed in vaporizing a controlled quantity of material from the surface of the workpiece, the vaporized material creating a plasma cloud over each spot, each successive spot being sufficiently displaced from the previous spot to minimize the effect of the plasma cloud thereon, and the spots eventually overlapping so as to cover the whole of a desired area to be machined. In this way, hard materials such as ceramics can be machined to high precision with minimal formation of microcracks.

16 Claims, 5 Drawing Sheets

LASER ROUGH AND FINISH MACHINING OF HARD MATERIALS

BACKGROUND OF THE INVENTION

1. Field of the Invention

This invention relates to a method and apparatus for machining workpieces, especially hard material workpieces such as ceramics, to dimensionally accurate shapes with close tolerances. The invention can be applied to the high speed manufacture of products requiring fine tolerances, such as valve seats, dies and molds.

2. Description of the Prior Art

The use of ceramics in industrial applications is increasing at a rapid rate. The problem is how to machine these materials economically to the tolerances required. The conventional method is to employ diamond grinding, but this technique is slow and expensive, and there are only a limited number of shapes to which it can be applied. As the rate of wear on the diamond wheels is high, frequent dressing and/or shaping is required, and being a mechanical process diamond grinding leaves a layer of degraded material on the workpiece.

Electrical machining has been applied to conductive workpieces, but this technique is useless for non-conductive workpieces and most of the disadvantages of diamond grinding also apply. Ultrasonic machining has been considered, but is slow and in its early stage of development.

Lasers have been used for ceramics, but have been commercially unsuccessful due to their inability to produce the desired fine tolerances in commercial products such as valve seats, dies and molds and their tendency to degrade the substrate material due to the formation of microcracks.

Copley et. al. ("Laser machining ceramics", S. M. Copley, International Laser Processing Conference, Anaheim Calif., Nov. 16–18, 1981) investigated the use of a continuous wave carbon dioxide laser to machine silicon nitride, sialon and silicon carbide workpieces. They successfully machined a 1.5" by 13 screw thread in Sialon. No visual cracks were found in the machined part, but neither mechanical nor metallographic testing was performed. In a subsequent study the same group reported that the strength of the laser machined parts was reduced by as much as 41.9%. This is brought about by microcracks being formed in the substrate during the machining process and which cause fracturing during subsequent use.

Other researchers (for example, "Structure and Properties of a Defect Layer after Pulse-repeated Laser Cutting of Ceramics". A. S. Kislyi, V. S. Kovalenkop and A. V. Manzheleev, verkhtverdye Materialy, vol. 9, No. 5, 1987) have used various types of lasers for machining ceramics. Most either did not evaluate the samples for cracking, or reported micro-cracks, with the affected zone extending up to about 100 microns, even when the laser was used in the pulse mode.

Efforts have been made to remove the maximum amount of material either by applying multiple laser pulses at the same spot, or in the case of a continuous laser keeping the traversing rate slow. This is because the mechanism of material removal in the majority of reported work has been the decomposition of $Si_3N_4$ to Si and $N_2$. Nitrogen is released as a gas, some silicon also evaporates and exerts enough vapor pressure to reduce further vaporization. If enough time is available the temperature at the surface decreases due to the energy absorption by the plasma, and molten silicon is formed. Increased pulse duration or increased interaction time during the continuous wave processing increases the amount of molten silicon. This molten silicon (which may be due to either longer interaction time or small surface area available to release the gases to the atmosphere, as in the case of blind, deep and small diameter holes) then re-solidifies on the walls as a mixture of silica and silicon. The amount of silica formed also depends upon the laser interaction time and the availability of oxygen.

Solidification of the silica along with silicon, and/or repeated heating and cooling of this layer promotes cracking. The cracks may either restrict themselves in the re-cast layer or extend into the underlying base material. In either case the strength of the machine material is reduced considerably. The strength of brittle materials is primarily dependent on the size of the cracks present, and the critical flaw length is very small for ceramics and other brittle material ($Klc = <5MP\sqrt{m}$). A large number of small cracks also have a detrimental effect on the strength of these brittle materials.

Various other laser machining techniques are known in the art. For instance U.S. Pat. No. 4,638,145, issued Jan. 29, 1987, describes a laser machining apparatus for performing high quality cuts on plate type work pieces wherein the laser output is varied according to the traversing speed of the laser beam. The object is to minimize burn-through loss when machining soft steel workpieces. The output and velocity of the laser are controlled according to a predetermined formula dependent on, the thickness and type of material. This patent does not address the problem of precision machining of hard materials or permit the production of fine machined finishes.

U.S. Pat. No. 4,560,856 describes a precision laser welding apparatus wherein the laser energy and number of laser pulses imparted to the workpiece are controlled. This patent relates primarily to the manufacture of metal nuclear fuel bundle assemblies, where the objective is to melt the substrate material in order to make a precision weld.

The following published Japanese Patent applications relate to laser machining: JP 55-112191; JP 56-9090; JP 58-196188; JP 60-231588; JP 61-245986 and JP 63-90379. These published patent applications disclose various techniques for the laser machining of materials, but none has proven satisfactory for the commercial fine machining of workpieces, especially hard workpieces such as ceramics.

JP 61-245986 is concerned specifically with hard materials. In this patent application, the number of applied pulses are controlled according to the area to be covered. This patent does not teach how to avoid the formation of microcracks, which is the major obstacle to obtaining a precision cut when machining ceramics, and furthermore only produces a very rough machined surface because the depth of machining cannot be precisely controlled. This is due in part to the fact the proportion of the incident energy absorbed by the substrate and used to vaporize the material can vary and in part due to the fact that the vaporized material forms a vapor or plasma cloud over the spot struck by the laser beam. This cloud absorbs a certain amount of energy from the next pulse, so the amount of energy available to vaporize the material cannot be precisely controlled.

An object of the present invention is to alleviate the aforementioned problems present in the prior art.

SUMMARY OF THE INVENTION

According to the present invention there is provided a method of laser machining workpieces, especially hard material workpieces of such as ceramics, comprising the steps of applying a high energy, short duration laser pulse to a succession of spots on the surface of a workpiece, the duration, wavelength, and energy of each laser pulse being such that said energy is substantially completely consumed in vaporizing a controlled quantity of material from the surface of the workpiece, the vaporized material creating a plasma cloud over each said spot, each successive said spot being sufficiently displaced from the previous spot to minimize the effect of the plasma cloud thereon, and said spots eventually overlapping so as to cover the whole of a desired area to be machined.

In this specification by hard materials is meant ceramics and other materials having brittle ceramic-like properties. While primarily concerned with hard materials, the invention also has utility for metals such as stainless steel, where fine precision finishes can be produced.

The present invention is based on the discovery that when a single very high energy, short duration pulse strikes the surface of the workpiece, it almost instantaneously vaporizes a predictable quantity of material. Since the material is completely vaporized, the problem of resolidification does not arise and the workpiece is thereby machined to a precisely controlled depth. Although a plasma cloud is inevitably formed over the spot on the workpiece struck by the laser beam, the effect of this cloud on the following pulse is minimized by moving the workpiece so that the next pulse hits a fresh spot on the surface of the workpiece. By arranging the speed of movement of the workpiece so that the successive pulses overlap, the surface machining can be carried out to a precisely controlled depth. The amount of overlap is determined by the traversing speed for a given pulse repetition rate.

The fact that the pulses are of very high energy and short duration causes nearly all the energy of the pulse to go into the vaporization of the surface material. The base material is therefore not significantly heated, and for practical purposes the process can be regarded as "cold machining". As a result, the risk of thermal shock to the substrate material is avoided, and the problem of microcracking substantially is reduced.

Preferably the laser is aimed at a series of successive partially overlapping spots while the workpiece is displaced relative to the laser.

The required pulse energy for vaporization may differ for different materials and has to be either calculated, using thermodynamic equations or determined by experiment. However, the pulse duration for ceramics should be in the micro or nanosecond range, preferably less than 80 microseconds and most preferably in the order of a few nanoseconds. These pulse durations can be achieved with a Q-switched YAG laser or an excimer laser. On metallic substrates, it is difficult to avoid melting as the latent heat of vaporization is significantly greater than the latent heat of melting, but nonetheless by careful selection of pulse duration, wavelength and energy good finishes can be achieved.

The invention also provides an apparatus for the laser machining of workpieces, especially of hard materials such as ceramics, comprising a high energy laser, means for mounting a workpiece to be machined, a control unit for generating from said laser a series of high energy, short duration pulses, and means for effecting relative displacement of said laser and said workpiece such that said laser pulses are directed at a succession of spots on the surface of the workpiece, the duration, wavelength, and energy of said pulses being such that each laser pulse is substantially completely consumed in vaporizing a controlled quantity of material from the surface of the workpiece, each successive said spot is sufficiently displaced from the previous spot to minimize the effect of a plasma cloud generated by the vaporized material, and said spots eventually overlap so as to cover the whole of a desired area to be machined.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
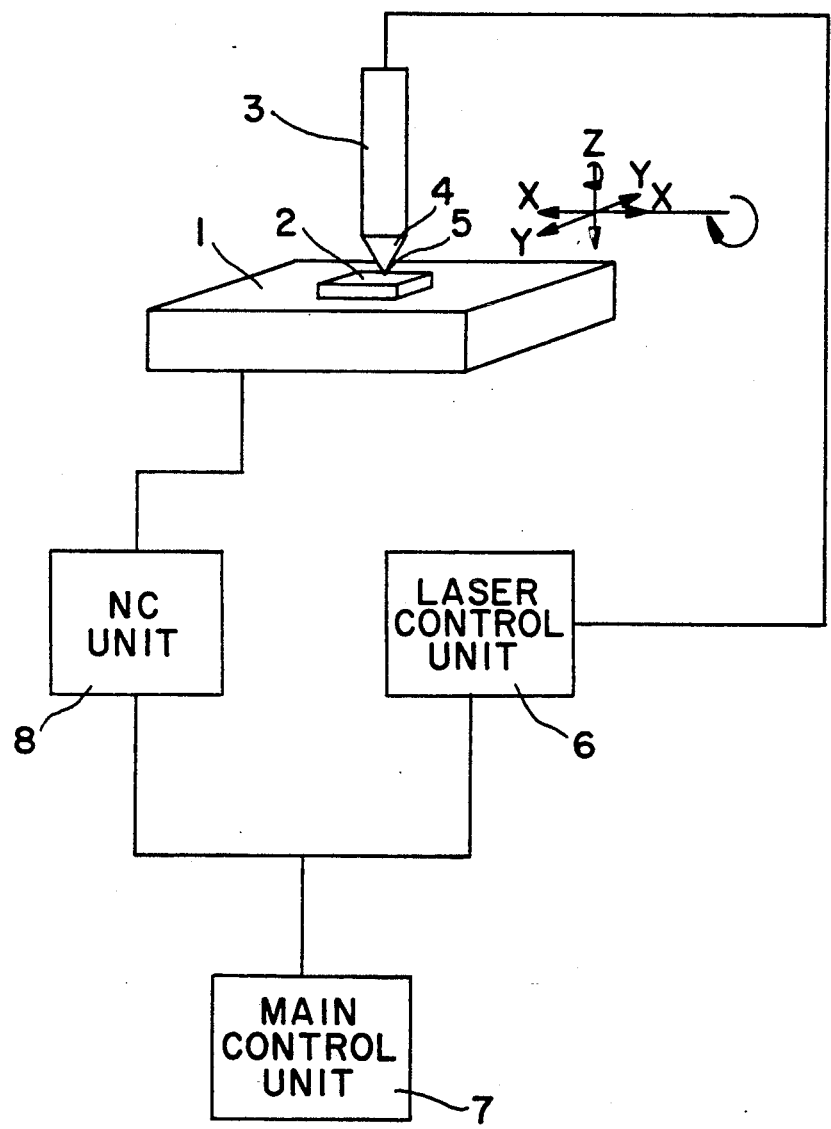
FIG. 1 is a perspective, schematic view of an apparatus for machining hard material workpieces.

The apparatus shown in FIG. 1 comprises a computer numerically controlled machine system capable of controlled movement on four axes by computer unit 8.

Mounted above the workpiece 2 is a laser 3 that generates a pulsed beam 4 of laser light focused onto an accurately known spot 5 on the surface of the work piece 2. The laser 3 is a commercial Q-switched Lumonics MS300 Nd:YAG laser or an excimer laser. The laser 3 is connected to a control unit 6 that permits the energy, timing and duration of the laser pulses emitted by the laser 3 to be precisely controlled. The numeric control unit 6 for the machine table 1 and the laser control unit 6 are connected to a central computer 7, synchronizing the operation of the laser 3 with the movement of the machine table 1.

Using an excimer laser with a pulse duration of 25 nanoseconds and a wavelength of 240–250 nm., fine finishes can be produced with no sign of cracking even under high magnification. The strength of the material is therefore not seriously affected by the machining process.

Tests were also carried out using a Lumonics MS300 Nd:YAG laser to determine the effect of various parameters on the machining process. Table 1 shows the laser parameters employed.

The experiments were carried out on 30 percent volume SiC whisker reinforced $Si_3N_4$ matrix composite, also on $TiN/SI_3N_4$ composite material. The energy used ranged from 0.8 Joules to 30 joules with various pulse widths to give peak pulse power in the range of 3,000-10,000 watts.

TABLE 1

| Energy Joules | Pulse width ms | Peak Pulse Power watt | Repetition rate Hz |
| --- | --- | --- | --- |
| 0.8 | 0.1 | 8000 | 200 |
| 1 | 0.1 | 10000 | 200 |
| 5 | 1 | 5000 | 50 |
| 9.2 | 2 | 4600 | 20 |
| 15 | 3 | 5000 | 10 |
| 20 | 4.2 | 4760 | 4 |
| 25 | 7.6 | 3290 | 4 |
| 30 | 9.7 | 3090 | 4 |

Single-Pulse Operation

The two materials were exposed to 1, 5, 9.2, 15, 20, 25 and 30 Joule single pulses from a plain non Q-switched Nd:YAG laser. Consequently nanosecond pulse durations were not attainable. Each pulse was fired into the material at a new location so that there was no overlapping of pulses. The total number of pulses applied at each energy level ranged from 10 for the high energy pulses to 200 for the low energy pulses. The sample was weighed before and after the application of pulses to determined the amount of material removed, which was then divided by the number of pulses applied to obtain the amount of material removed per pulse. The diameter of these pulses was measured at the different energy levels using an optical microscope. The diameter was measured on a minimum of five spots in at least two directions, and the mean values were recorded for the respective energy level.

The results of the single-pulse operation on both materials are shown in table 2.

TABLE 2

| Energy Joules | Pulse width ms | Pulse Power watt | Rep. rate | SiC/Si$_3$N$_4$ mtl. rmvd. mg/pls | SiC/Si$_3$N$_4$ Dia mm | TiN/Si$_3$N$_4$ mtl. rmvd. mg/pls | TiN/Si$_3$N$_4$ Dia mm |
| --- | --- | --- | --- | --- | --- | --- | --- |
| 1 | 0.1 | 10000 | 200 | 0.015 | 0.683 | 0.005 | 1.117 |
| 5 | 1 | 5000 | 50 | 0.035 | 1.546 | 0.040 | 1.551 |
| 9.2 | 2 | 4600 | 20 | 0.21 | 1.305 | 0.16 | 1.468 |
| 15 | 3 | 5000 | 10 | 0.29 | 1.546 | 0.385 | 1.384 |
| 20 | 4.2 | 4760 | 4 | 0.57 | 1.158 | 0.67 | 1.160 |
| 25 | 7.6 | 3290 | 4 | 0.58 | 1.475 | 0.77 | 1.300 |
| 30 | 9.7 | 3090 | 4 | 0.7 | 1.549 | 0.8 | 1.452 |

The diameters of the spot produced on both materials follow no general pattern as the incident energy increases. However, at the same energy level, the spot diameters obtained on both materials are similar. The minimum diameter occurred at the 20 Joule energy level in both materials.

Figure 2:
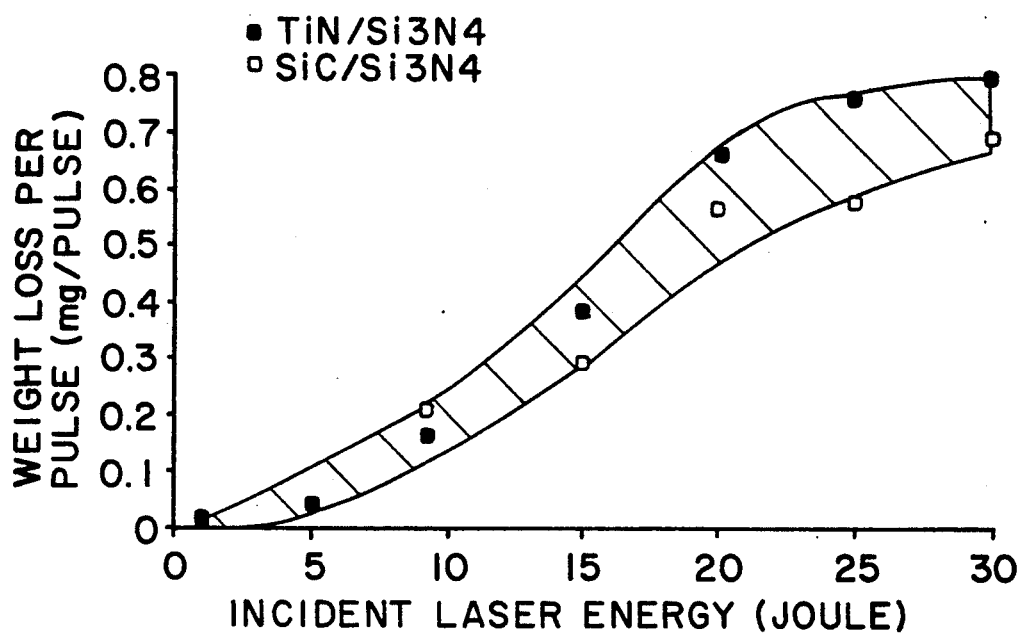
FIG. 2 is a graph showing the theoretical beam diameter, and the spot sizes obtained against the beam energy.
Figure 3:
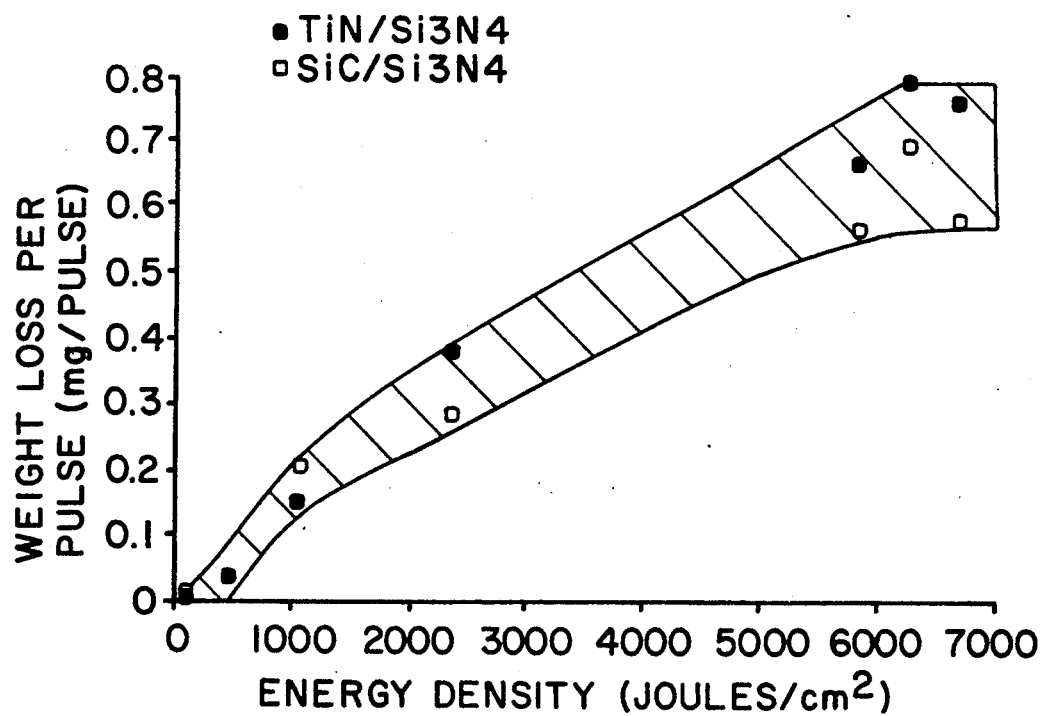
FIG. 3 is a graph showing material removed per pulse for single pulse operation against energy density.

In FIGS. 2 and 3, the material removed per pulse is plotted against the incident laser energy and the incident energy density respectively. The incident energy density is calculated by dividing the incident energy with the theoretical beam area, which in turn was calculated using the theoretical beam diameter. In these two figures, a band is shown, which can be used to roughly estimate the weight removed per pulse at the incident energy or energy density range reported. Generally, the amount of material removed per pulse increases with the increasing incident energy and energy density. However, there appears to be a peak at about 6300 joules/cm$^2$ in FIG. 4.

Both materials, SiC/Si$_3$N$_4$, followed similar curves and the difference between the amount of material removed per pulse for both materials at any energy level is within the experimental error. The minor difference in the weight removed per pulse can be attributed to the difference in the absorption characteristics and the thermal diffusivity of the two materials.

TABLE 3

Bulk Data for the Overlapping Operation on TiN/SiN$_4$ Composite

| Energy Joules cc/min | Rep. Rate Hz | Plse Wdth ms | Weight Loss mg | Weight Loss mg/plse | Depth in | Area covered | Spd ipm | Overlap % × % | Surface micro inch | No. of plses | Mt. Rm. Rate |
| --- | --- | --- | --- | --- | --- | --- | --- | --- | --- | --- | --- |
| 0.8 | 200 | 0.1 | 2 | 0.0018 | — | .9 × .9 | 360 | 25 × 25 | 19–38 | 1080 | 0.007 |
| 0.8 | 200 | 0.1 | 9.2 | 0.0017 | — | .96 × 1 | 240 | 50 × 50 | 29–38 | 5300 | 0.007 |
| 0.8 | 200 | 0.1 | 2.7 | 0.001 | — | .95 × 1 | 240 | 50 × 50 | 29–37 | 2700 | 0.004 |
| 0.8 | 200 | 0.1 | 16.9 | 0.041 | — | | 132 | 75 × 75 | | 4079 | |
| 1 | 200 | 0.1 | 0.7 | 0.0027 | .0005 | .41 × .38 | 360 | 25 × 25 | 31–41 | 252 | 0.01 |
| 1 | 200 | 0.1 | 1.4 | 0.0019 | — | .45 × .52 | 240 | 50 × 50 | 29–34 | 702 | 0.007 |
| 1 | 200 | 0.1 | 10 | 0.0048 | .0005 | .49 × .45 | 360 | 75 × 75 | — | 2080 | 0.018 |
| 5 | 50 | 1 | 13 | 0.084 | .001 | .45 × .52 | 135 | 25 × 25 | 139–206 | 134 | 0.087 |
| 5 | 50 | 1 | 46 | 0.0847 | .0015 | .55 × .8 | 90 | 50 × 50 | 122–1796 | 546 | 0.079 |
| 5 | 50 | 1 | 147 | 0.1246 | .001 | .5 × .52 | 45 | 75 × 75 | — | 1178 | 0.11 |
| 9.2 | 20 | 2 | 40 | 0.268 | .003 | .45 × .52 | 52 | 25 × 25 | — | 149 | 0.1 |
| 9.2 | 20 | 2 | 164 | 0.2529 | .006 | .55 × .65 | 30 | 50 × 50 | 383 | 650 | 0.094 |
| 9.2 | 20 | 2 | 409.4 | 0.348 | | | 17.3 | 50 × 50 | | 1176 | |
| 15 | 10 | 3 | 79 | 0.44 | .005 | .49 × .52 | 24.5 | 25 × 25 | — | 189 | 0.082 |
| 15 | 10 | 3 | 178 | 0.5515 | .014 | .5 × .35 | 15 | 50 × 50 | — | 322 | 0.103 |
| 15 | 10 | 3 | .9775 | 0.607 | | | 8.172 | 75 × 75 | | 1610 | |
| 20 | 4 | 4.2 | 169 | 0.668 | .007 | .48 × .52 | 8.2 | 25 × 25 | — | 254 | 0.05 |
| 20 | 4 | 4.2 | 299 | 0.8211 | .024 | .52 × .32 | 5.76 | 50 × 50 | — | 364 | 0.061 |
| 20 | 4 | 4.2 | 1130 | 0.7554 | .097 | .52 × .39 | 2.21 | 75 × 75 | — | 1500 | 0.056 |

Multiple Overlappinq-Pulse Operation

In a second set of experiments, the Ti/Si$_3$N$_4$ composite material Was exposed to 0.8, 1, 5, 9.8, 15, 20, Joule pulses. Overlapping passes of 25%, 50% and 75% in both directions were made. Traversing speed and the offset was determined for the repetition frequency and spot diameter, as measured for single-pulse operation.

The bulk data are shown in table 3.

The surface finish is the root mean square variation in microinches. Table 3 shows that the surface finish becomes finer at shorter pulse durations.

These tests were carried out with a plain non-Q-switched Nd:YAG laser, and it was not possible to attain the very short durations attainable with Q-switching or an excimer laser. At the very short durations, in the order of nanoseconds, the finish improves still further and the microcrack formation essentially disappears.

Figure 4:
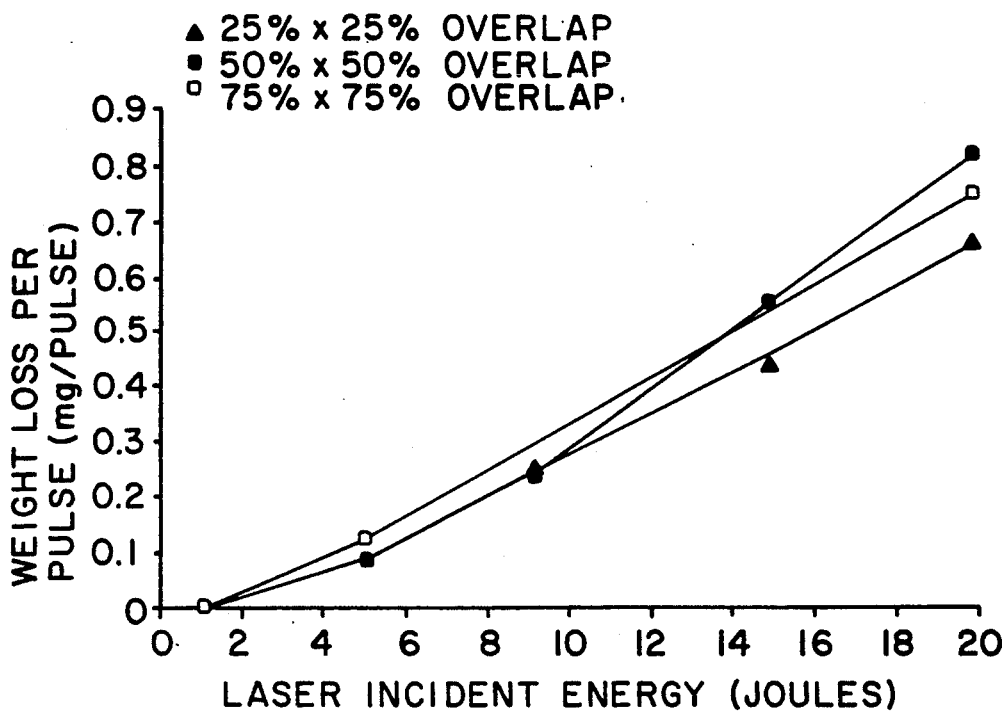
FIG. 4 is a graph showing the weight loss per pulse plotted against the incident laser energy.
Figure 5:
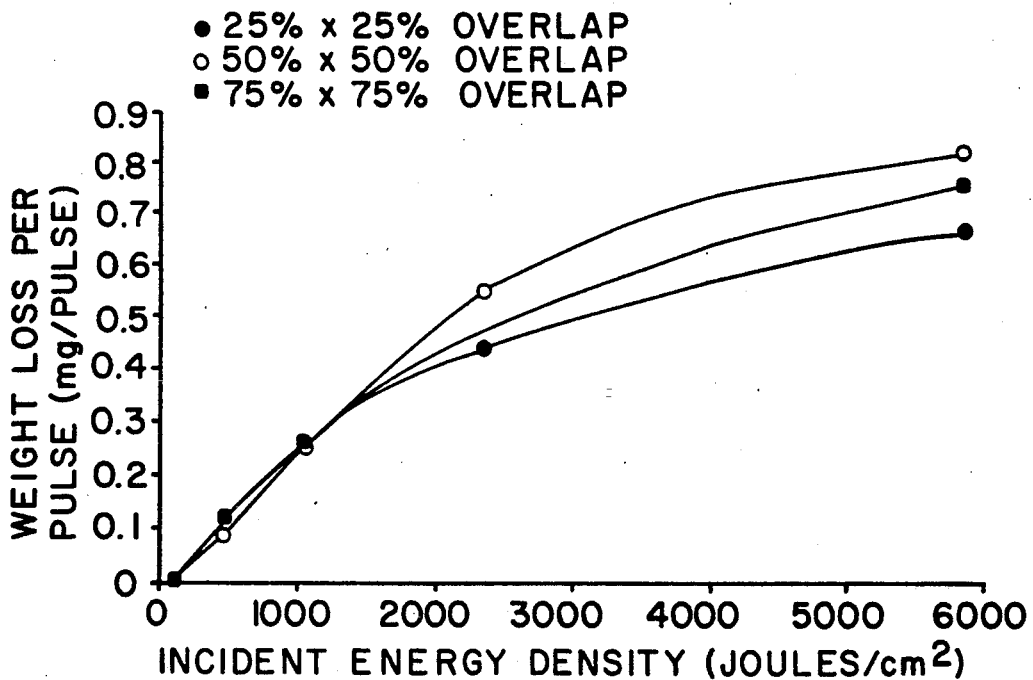
FIG. 5 is a plot showing the material removed per pulse (mg/pulse) against the incident energy density for overlapping passes.

The material removal rate was calculated by dividing the total weight loss by the density of the material to obtain the mass (cc) of the material removed, which was then divided by the time, calculated from the number of pulses applied and the frequency used to apply that number of pulses. The total number of pulses applied was counted for each energy level. The surface roughness of the areas scanned with lower laser power was measured. Surface roughness values as low as 19-38 μin were obtained on samples treated at low incident energy levels. Higher incident energy levels tend to produce rougher surfaces. In this first phase no attempt was made to optimize the process for surface finish. FIGS. 4 and 5 show the weight loss per pulse plotted against the incident laser energy and energy density, respectively, for overlapping passes. It is evident from these figures that the weight loss per pulse increases with increasing incident laser energy or energy density. The degree of overlap also have a minor influence on the weight loss. At low incident energy levels, the three overlapping-conditions used (25%×25%, 50%×50% and 75%×75%) does not have a significant influence on the total weight loss. However, at higher incident energy levels, the maximum weight loss occurred at 50%×50% pulse overlapping. A comparison of FIGS. 2 and 3 with FIGS. 4 and 5 respectively shows that the weight loss is similar in both conditions, i.e. single pulse and overlapping pulse configuration. This indicates a high degree of efficiency in the overlapping pulse operation, without much loss of energy due to plasma absorption or conduction of heat into the material.

Figure 6:
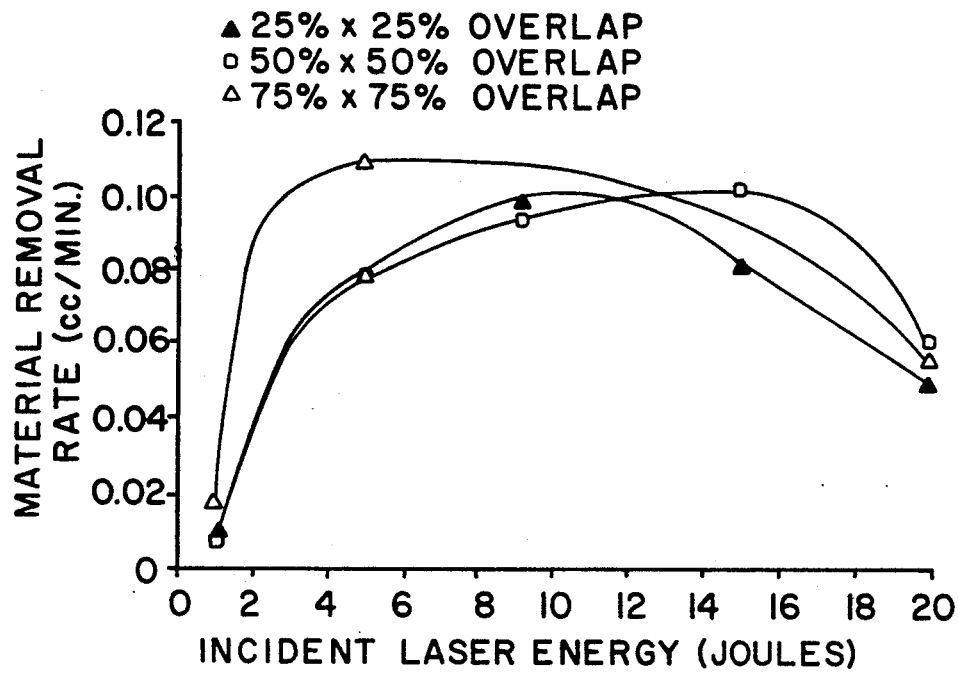
FIG. 6 is a plot showing the material removal rate against the incident laser energy for overlapping passes.
Figure 7:
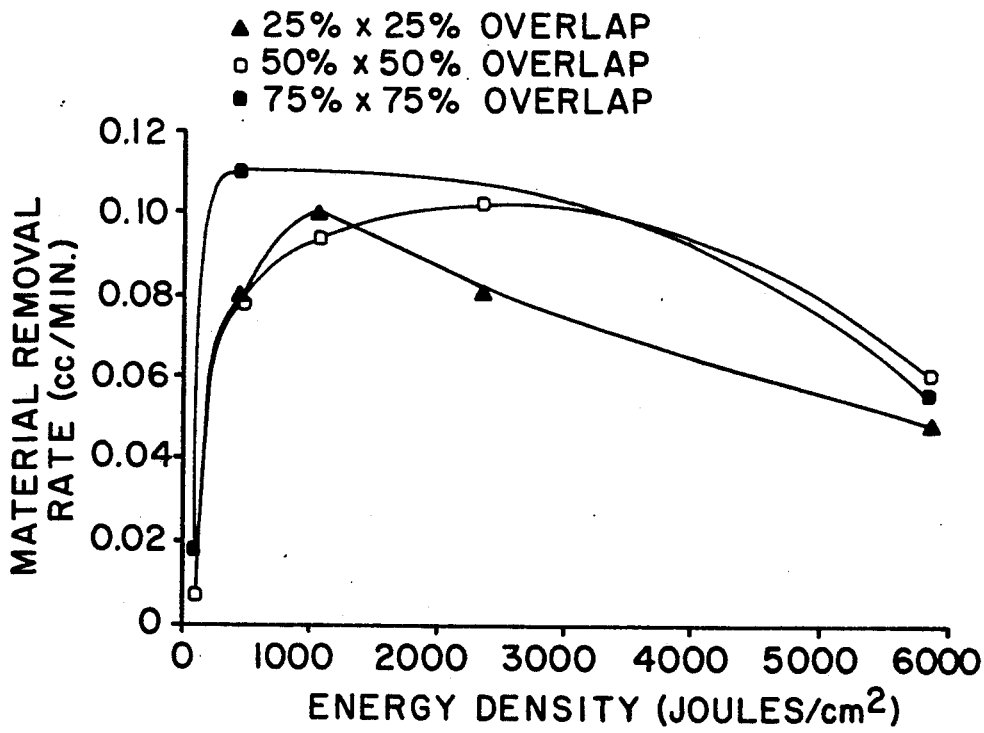
FIG. 7 is a plot showing the material removal rate against the energy density for overlapping passes.

The material removal rate, calculated on the basis of pulse repetition rate, is plotted against incident energy and incident energy density in FIGS. 6 and 7 respectively. Higher incident energy or energy density shows a lower material removal rate because in order to increase the pulse power, the pulse length has to be increased and repetition rate decreased. Increased pulse duration and decreased repetition rate reduced the traversing speed needed to apply the required overlap, and hence the material removal rate.

The maximum material removal rate is 0.11 cc/min was obtained at a laser energy level of about 5 Joule and 75%×75% overlapping condition. For 25%×25% and 50%×50% overlapping conditions the maximum material removal rates of 0.1 and 0.105 cc/min were obtained at energy levels of 0.2 J and 15 J respectively. This material removal rate vs. energy or energy density diagrams can provide an initial estimate of the material removal rate for a given incident energy and overlapping condition.

Tests were also carried out on the Ti/Si$_3$N$_4$ composite material using an excimer laser and different pulse durations. In each case the energy was kept constant and the degree of microcracking observed in high magnification photographs. The results are shown in table 4. The microcracking was estimated on a scale of 1-10, with 1 representing no observable cracking and 10 representing bad cracking. The energy in each case was 2.4 Joules.

TABLE 4

| Pulse duration | Degree of cracking observed |
| --- | --- |
| 18 ms | 10 |
| 12 ms | 10 |
| 6 ms | 8 |
| 3 ms | 8 |
| 1.2 ms | 8 |
| 0.8 ms | 5 |
| 0.6 ms | 5 |
| 0.4 ms | 3 |
| 0.2 ms | 3 |
| 0.1 ms | 3 |
| 25 nanosecs. | 1 |

Figure 8:
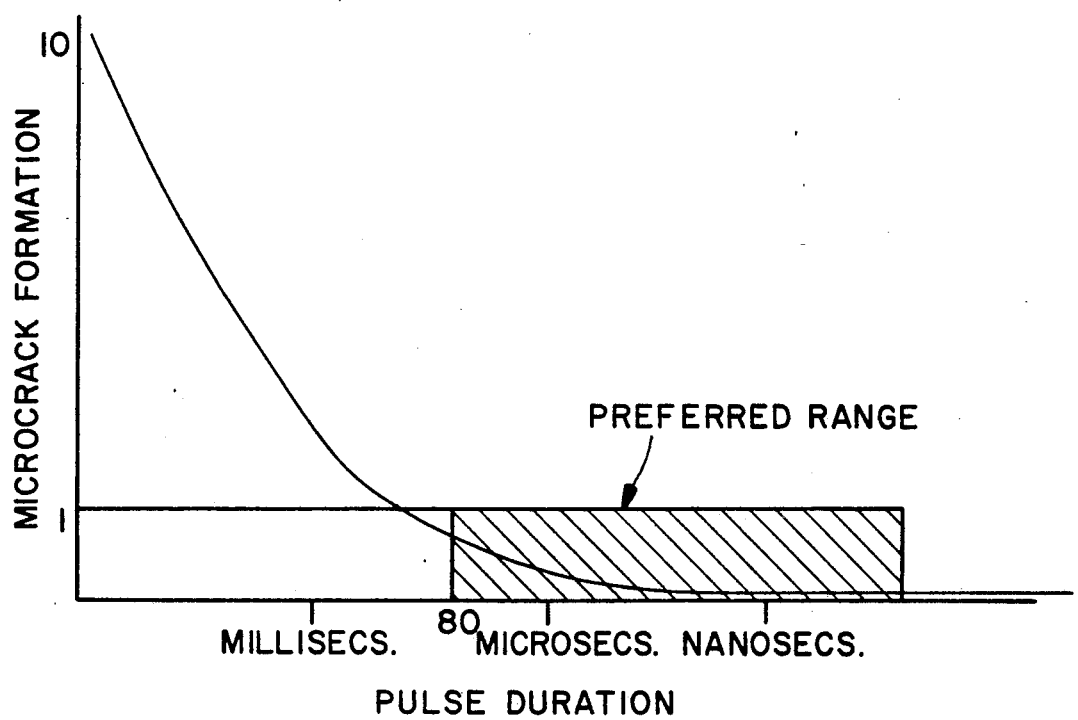
FIG. 8 is a rough plot showing the effect of pulse duration on microcrack formation.

It can be seen that while the cracking decreased quite markedly in the millisecond range, no observable cracking occurred in the nanosecond range, and in fact pulse durations below about 80 microseconds give good results, with excellent results being obtained in the nanosecond range. FIG. 8 shows this effect graphically.

The use of high energy, short duration overlapping pulses, with the laser being shifted between each pulse, permits very fine finishes to be obtained on a variety of materials, especially hard materials, but also on softer materials such as stainless steel and the like. This is because the quantity of material vaporized is consistent for each pulse as the effect of the plasma cloud formed by the previous pulse is avoided. The short duration pulses minimize microcracking and at very short durations, in the order of nanoseconds, the microcracking is substantially eliminated.

We claim:
1. A method of laser machining hard material workpieces, comprising the steps of:
   (i) aiming a laser at a precise spot on a surface of the workpiece;
   (ii) applying a single high energy, short duration laser pulse to said spot to vaporize a controlled quantity of material therefrom, the energy and duration of each laser pulse being such that said energy is substantially completely consumed in vaporizing a controlled quantity of material from the surface of the workpiece, and the vaporized material creating a plasma cloud over said spot;
   (iii) Without waiting for said plasma cloud to dissipate, aiming said laser at a new spot partially overlapping the previous spot, the new spot being sufficiently displaced from the previous spot (for) to minimize the effects of the plasma cloud still present over the previous spot on the new spot (to be minimized);
   (iv) repeating step (ii) at the new spot; and
   (v) repeating steps (iii) and (iv) over a series of successive overlapping spots covering a desired area to be machined.
2. A method of laser machining hard material workpieces as claimed in claim 1, wherein the workpiece is displaced relative to the laser as the laser is aimed at successive spots on the surface of the workpiece.
3. A method of laser machining hard material workpieces as claimed in claim 1, wherein the duration of said pulses is less than about 80 microseconds.
4. A method of laser hard material workpieces as claimed in claim 1, wherein the duration of said pulses is in the order of a few nanoseconds.

5. A method of laser machining hard material workpieces as claimed in claim 1, wherein said hard material is a ceramic.

6. A method of laser machining hard material workpieces as claimed in claim 1, wherein said hard material is $TiN/Si_3N_4$.

7. A method of laser machining hard material workpieces as claimed in claim 1, wherein said hard material is $SiC/Si_3N_4$.

8. A method of laser machining hard material workpieces as claimed in claim 1, wherein said laser is a Q-switched Nd:YAG laser.

9. A method of laser machining hard material workpieces as claimed in claim 1, wherein said laser is an excimer laser.

10. An apparatus for the laser machining of workpieces, especially hard material workpieces, comprising:
  means for mounting a workpiece to be machined;
  a control unit for generating from said laser a series of high energy, short duration pulses, the duration, wavelength and energy of said pulses being such that when targeted on a surface of the workpiece each pulse substantially completely consumes a controlled quantity of material therefrom to form a plasma cloud over the current spot; and
  means for effecting relative displacement of said laser and said workpiece, after each laser pulse and without waiting for the plasma cloud to dissipate, from a target spot to an adjacent partially overlapping spot on the surface to be machined, said adjacent spot being sufficiently displaced from said target spot to minimize the effects of the plasma cloud still present over said target spot during the next pulse, said overlapping spots eventually covering the whole surface to be machined.

11. An apparatus as claimed in claim 10, wherein the substrate is mounted on a numerically controlled machine table.

12. An apparatus as claimed in claim 10, wherein said means for effecting relative displacement aims said laser at a succession of partially overlapping spots.

13. An apparatus as claimed in claim 10, wherein the control unit generates pulses having a duration of less than 80 microseconds.

14. An apparatus as claimed in claim 10, wherein the control unit generates pulses having a duration in the order of a few nanoseconds.

15. An apparatus as claimed in claim 10, wherein said laser is a Q-switched Nd:YAG laser.

16. An apparatus as claimed in claim 10, wherein said laser is an excimer laser.

* * * * *

UNITED STATES PATENT AND TRADEMARK OFFICE
CERTIFICATE OF CORRECTION

PATENT NO. : 5,138,130
DATED : August 11, 1992
INVENTOR(S) : M.U. Islam, Gavin McGregor, and G. Campbell It is certified that error appears in the above-identified patent and that said Letters Patent is hereby corrected as shown below:

In column 5, line 1, "30 joules" should read --30 Joules--.

In column 5, line 27, change "determined" to read --determine--.

In column 6, line 28, "joules/cm$^2$" should read --Joules/cm$^2$--.

In column 6, line 63, "Was" should read --was--.

In column 8, line 50, delete "(for)".

In column 8, lines 52-53, delete "(to be minimized);"

In column 8, line 66, after "laser", insert --machining--.

Signed and Sealed this

Twenty-third Day of November, 1993

BRUCE LEHMAN

Attest:

Attesting Officer

Commissioner of Patents and Trademarks